United States Patent
Wagner et al.

(10) Patent No.: US 8,548,818 B2
(45) Date of Patent: Oct. 1, 2013

(54) METHOD AND SYSTEM FOR AUTHENTICATING CUSTOMER IDENTITIES

(75) Inventors: Theresa Lynn Wagner, Papillion, NE (US); Peggy Ann Pinkerton, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1265 days.

(21) Appl. No.: 12/023,537

(22) Filed: Jan. 31, 2008

(65) Prior Publication Data

US 2009/0198587 A1 Aug. 6, 2009

(51) Int. Cl.
*G06Q 10/00* (2012.01)

(52) U.S. Cl.
USPC .......... 705/1.1; 705/51; 705/55; 705/64; 705/67; 726/2; 726/28; 340/5.81

(58) Field of Classification Search
USPC ........................................... 705/1.1
See application file for complete search history.

(56) References Cited

U.S. PATENT DOCUMENTS

| | | | | |
|---|---|---|---|---|
| 5,180,309 A * | 1/1993 | Egnor | ............ | 434/323 |
| 6,263,447 B1 | 7/2001 | French et al. | | |
| 6,898,411 B2 * | 5/2005 | Ziv-el et al. | .......... | 434/350 |
| 6,961,858 B2 * | 11/2005 | Fransdonk | ........... | 726/29 |
| 7,020,635 B2 * | 3/2006 | Hamilton et al. | ......... | 705/51 |
| 7,080,049 B2 * | 7/2006 | Truitt et al. | ............ | 705/75 |
| 7,090,128 B2 * | 8/2006 | Farley et al. | ........... | 235/384 |
| 7,107,462 B2 * | 9/2006 | Fransdonk | ............ | 713/193 |
| 7,150,045 B2 * | 12/2006 | Koelle et al. | ............ | 726/26 |
| 7,251,624 B1 * | 7/2007 | Lee et al. | ............ | 705/35 |
| 7,467,401 B2 * | 12/2008 | Cicchitto | ............ | 726/4 |
| 7,620,606 B2 * | 11/2009 | Gentry et al. | ........... | 705/76 |
| 7,623,715 B2 * | 11/2009 | Filatov et al. | .......... | 382/229 |
| 8,151,343 B1 * | 4/2012 | Wang et al. | ........... | 726/19 |
| 2003/0105959 A1 * | 6/2003 | Matyas et al. | ........... | 713/168 |
| 2003/0154406 A1 * | 8/2003 | Honarvar et al. | ....... | 713/201 |
| 2004/0123162 A1 * | 6/2004 | Antell et al. | ........... | 713/202 |
| 2004/0189441 A1 * | 9/2004 | Stergiou | ........... | 340/5.51 |
| 2005/0039057 A1 * | 2/2005 | Bagga et al. | ........... | 713/202 |
| 2005/0071168 A1 * | 3/2005 | Juang et al. | ........... | 704/273 |
| 2005/0090307 A1 * | 4/2005 | Walker et al. | ........... | 463/20 |
| 2005/0216768 A1 * | 9/2005 | Eppert | ........... | 713/201 |
| 2005/0246278 A1 * | 11/2005 | Gerber et al. | ........... | 705/44 |
| 2006/0036868 A1 * | 2/2006 | Cicchitto | ........... | 713/182 |
| 2006/0089906 A1 * | 4/2006 | Rowley | ........... | 705/40 |
| 2006/0288225 A1 * | 12/2006 | Jung et al. | ........... | 713/182 |

(Continued)

OTHER PUBLICATIONS

White, How Computers Work, Nov. 14, 2007, Que Publishing, Ninth Edition, all pages.*

(Continued)

*Primary Examiner* — Jacob C. Coppola
(74) *Attorney, Agent, or Firm* — Kilpatrick Townsend & Stockton

(57) ABSTRACT

This disclosure describes, generally, methods and systems for authenticating the identities of customers. For example, a method comprising receiving a service request from a customer and retrieving customer profile information related to the customer is described. The method further comprises generating questions based on the customer profile information and receiving answers to the questions from the customer. Furthermore, the method comprises analyzing the answers by comparing the answers with the customer profile information and calculating an authentication score based on the analysis of the answers. The method further authenticates the customer based on the authentication score being greater than a threshold score level.

14 Claims, 5 Drawing Sheets

(56) References Cited

U.S. PATENT DOCUMENTS

| | | | |
|---|---|---|---|
| 2007/0177768 A1* | 8/2007 | Tsantes et al. | 382/115 |
| 2007/0219792 A1* | 9/2007 | Normandin | 704/239 |
| 2007/0261109 A1 | 11/2007 | Renaud et al. | |
| 2007/0283142 A1* | 12/2007 | Milstein et al. | 713/155 |
| 2008/0003559 A1* | 1/2008 | Toyama et al. | 434/350 |
| 2008/0040276 A1* | 2/2008 | Hammad et al. | 705/44 |
| 2008/0120507 A1* | 5/2008 | Shakkarwar | 713/182 |
| 2009/0055193 A1* | 2/2009 | Maislos et al. | 704/273 |
| 2009/0089876 A1* | 4/2009 | Finamore et al. | 726/21 |
| 2009/0106134 A1* | 4/2009 | Royyuru | 705/35 |
| 2009/0150320 A1* | 6/2009 | Geppert | 706/47 |
| 2009/0178120 A1* | 7/2009 | Royyuru et al. | 726/4 |
| 2009/0198587 A1* | 8/2009 | Wagner et al. | 705/26 |

OTHER PUBLICATIONS

Just, Mike, Designing Authentication Systems with Challenge Questions, 2005, all pages.*
Just, Mike, Designing and Evaluating Challenge-Question Systems, IEEE Computer Society, 2004, all pages.*
Marshall, Bruce K., Tips for Avoiding Bad Authentication Challenge Questions, White Paper, Security Professional Services, Inc., 2007, all pages.*
PCT International Search Report and Written Opinion mailed Mar. 11, 2009; International Application No. PCT/US2009/030613; 11 pages.

* cited by examiner

METHOD AND SYSTEM FOR AUTHENTICATING CUSTOMER IDENTITIES

FIELD OF THE INVENTION

The present invention relates, in general, to authentication, and more particularly, to authentication of customer identities.

BACKGROUND

Presently, during a financial transaction authentication of a customer's identity may be accomplished by a customer presenting some form of identification (e.g., a driver's license or other government issued identification card) to a customer services representative. The representative then checks the information on the identification (e.g., the name, address, date of birth, photograph) against the financial entity's records. Accordingly, if the information on the identification is consistent with the financial entity's records, the customer's identity is authenticated.

Alternatively, the authentication processes may be accomplished through a phone conversation with the customer service representative. The representative asks the customer a series of questions (e.g., social security number, mother's maiden name, address, etc.) in order to verify the customer's identity. In some instances, the answers to the authentication questions are referred to an analyst that manually verifies the correctness of the answers.

These types of authentication are expensive and inconvenient. In order for the customer's identity to be authenticated, they are required to interact with a customer service representative and/or analyst. The need for such people does not allow for automation of the process. The authenticating entity is also required to employ these people (e.g., a 24-hour call center), which can be cost prohibitive. Furthermore, where many transactions are completed "on-line," requiring a customer to communicate with a representative is inconvenient and may even prohibit such transactions.

An additional shortcoming of current authentication processes is that questions presented to customers are often multiple choice questions. For example, the authentication process in U.S. Pat. No. 6,263,447 to French, et al. issued Jul. 17, 2001, which is incorporated by reference in its entirety for any purpose. These types of questions present at least two problems. One problem is that a fraudulent actor may be able to guess the correct multiple choice answer. A second problem is the privacy of the information presented in the multiple choice answers. The correct answer in the multiple choice questions inevitably contains personal information about the customer. Thus, the fraudulent actor is able to obtain personal information about a customer by discerning the correct multiple choice answer. Accordingly, the methods and systems of the present invention provide solutions to these and other problems.

BRIEF SUMMARY OF THE INVENTION

Embodiments of the present invention provide a financial institution, or other entity, with the ability to authenticate customer identities in an automated, convenient and cost effective way. For example, a customer is able to logon to a website and answer a series of open-ended personal questions in order to be authenticated. These open-ended questions may be generated from information the financial institution already has about the customer. However, since the questions are open-ended, no personal information is presented when the question is presented. In one embodiment, the authentication process may be implemented according to the authentication process of AuthentiQ™ developed by First Data Corporation of Greenwood Village, Colo.

Furthermore, because the authentication system is automated, customer service representatives and/or analysts are not needed to review the customer's answers. The answers can be scored and the customer's identity can be authenticated without the need for manual verification. Thus, embodiments of the present invention provide a fast, easy and convenient process for authentication of a customer's identity.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software program is encoded on physical and/or tangible computer readable media (such as, merely by way of example, a machine-readable medium, optical media, magnetic media, and/or the like). In a particular embodiment, the set of instructions might be incorporated within an enterprise application and/or might be provided as a separate computer program that can be used to configure the enterprise application.

An exemplary embodiment of the invention provides a method for automated authentication of a customer's identity. The method, in some embodiments, comprises receiving a service request from a customer and retrieving customer profile information related to the customer. The method may further comprise generating questions based on the customer profile information and receiving answers to the questions from the customer.

According to a further embodiment of the invention, the method may comprise automatically analyzing the answers by comparing the answers with the customer profile information and calculating an authentication score based on the analysis of the answers. The method may also comprise authenticating the customer if the authentication score is within an acceptable range.

An exemplary system for authentication of a customer's identity is provided. The system may comprise a question database which is configured to store authentication questions and a customer database which is configured to store customer profile data. Embodiments of the system my further comprise a processing center which is coupled to the question database and the customer database. The possessing center may be configured to receive a service request from a customer and retrieve customer profile data related to the customer from the customer database. The processing center may further be configured to retrieve questions from the question database based on the customer profile data.

The processing center may further present the questions to the customer and receive the answers to the questions. An automated analysis of the answers may be made by comparing the answers with the customer profile information. The processing center may then calculate an authentication score based on the analysis of the answers, and authenticate the customer if the authentication score is within an acceptable range.

Another exemplary embodiment of the invention provides a machine-readable medium which when executed by a machine causes the machine to perform automated authentication of a customer's identity. The machine-readable medium, in some embodiments, causes the machine to receive a service request from a customer and retrieve customer profile information related to the customer. The machine-readable medium may further cause the machine to generate questions based on the customer profile information and receive answers to the questions from the customer.

According to a further embodiment of the invention, the machine-readable medium may cause the machine to automatically analyze the answers by comparing the answers with the customer profile information and calculating an authentication score based on the analysis of the answers. The machine-readable medium may further cause the machine to authenticate the customer if the first authentication score is within an acceptable range.

Hence, embodiments of the invention overcome a variety of shortcomings of previous solutions, including without limitation those described above, as well as others that will become apparent to one of skill in the art upon review of this disclosure.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specifying an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with other embodiments as well. By the same token, however, no single feature or features of any described embodiment should be considered essential to the invention, as other embodiments of the invention may omit such features.

Figure 1:
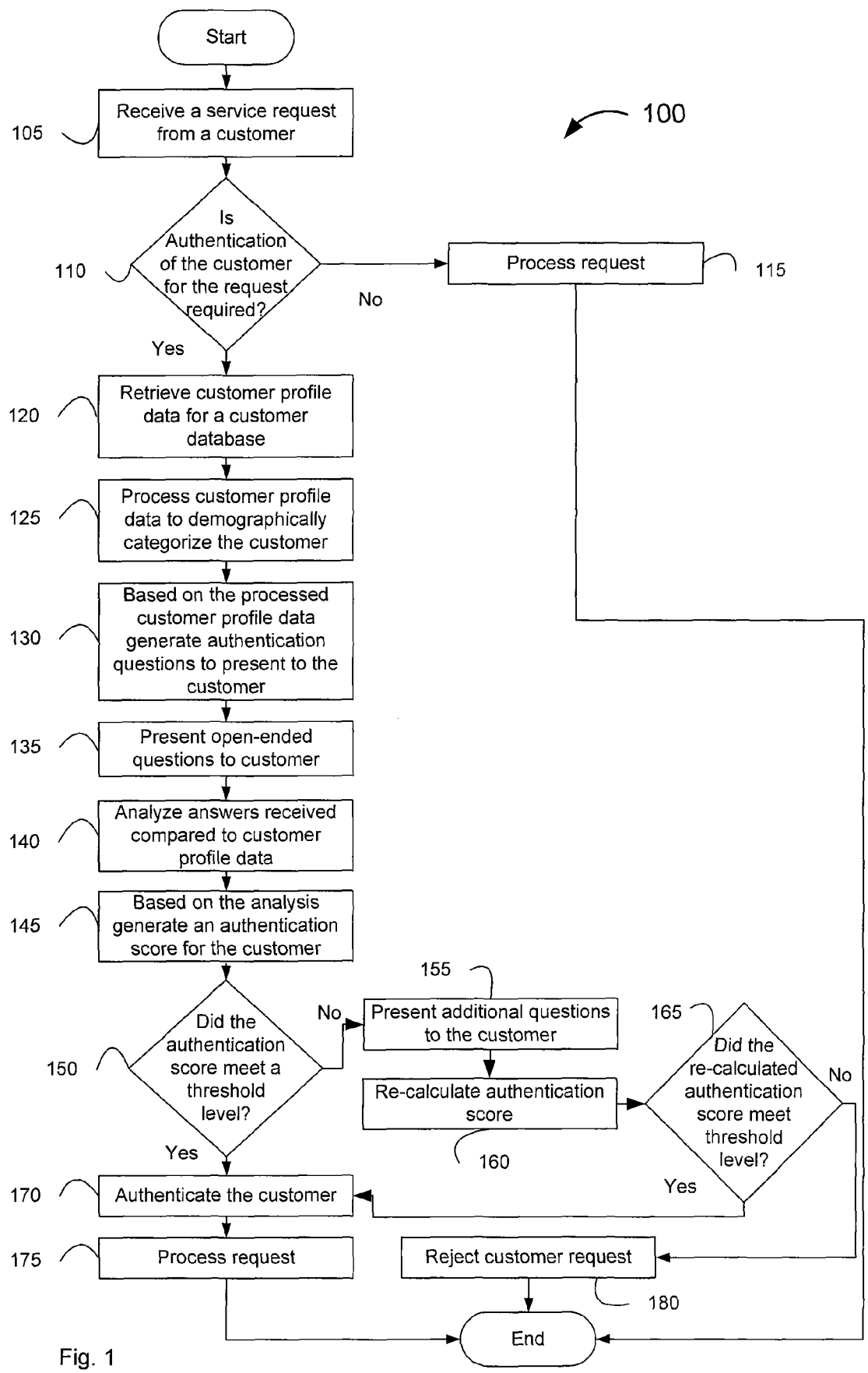
FIG. 1 is a flow diagram illustrating a method for verifying customer identities, in accordance with various embodiments of the invention.

Turning now to FIG. 1 which illustrates a method 100 for authenticating a customer's identity. At process block 105, an authenticating entity (e.g., a financial institution) receives an authentication request from a customer. The request may be made, for example, via a web interface, an interactive voice recognition (IVR) system, an automated teller machine (ATM), etc. Furthermore, the request may be in relation to processing, merely by way of example, a new application (e.g., a credit card application, a loan application, line of credit application, a mortgage application, etc.), a new presentation instrument activation (e.g., a credit card, an ATM card, a prepaid MasterCard™ or Visa™, a gift card, etc.), a presentation instrument replacement, a change of address (or other personal information) request, an account limit increase request, a point-of-sale (POS) transaction, etc.

According to various embodiments, some requests may not require authentication. Thus, at decision block 110 a determination is made whether or not authentication of the customer is required for the request. If authentication is not required, the request is processed (process block 115); however, if authentication is required, then the customer's profile data is retrieved from, for example, a customer database, such as customer database 310 in FIG. 3 (process block 120). In one embodiment, the information in the customer profile may be retrieved from a trade database, such as, Experian™, Equifax™, TransUnion™, etc.

In one embodiment, the customer profile data may be divided into a variety of categories. For example, the categories may include customer identification information, customer's relatives information, address history, vehicle history, real estate history, business information, etc. The identification information category may include information such as, the customer's name, address, phone number, the customer's race or nationality, apartment complex name, date of birth, state of birth, length of time at current residence, one of the customer's neighbors name, etc.

The customer's relatives information may include names of family members, ages of family members, number of family members living with the customer, etc. Further, the address history category may include previous addresses, persons who lived with the customer at a previous address, telephone number of a previous address, etc. The vehicle category may include the driver's license number of the customer, current and previous license plate numbers, vehicle registration information, make and model of vehicles, year of vehicle, etc. The real estate category may include information such as, the names on the customer's real estate title, the year the customer's home was built, the number of bedrooms in the customer's home, the county of the home, etc.

The business category may be used for customers who are companies and/or represent companies. For example, some information in this category may include the number of employees employed by the company, the age of the company, the company's industry, the annual revenue of the company, the corporate headquarters of the company, etc.

At process block 125, based on the various information included in the customer profile data, the customer may be demographically categorized. For example, the customer may be categorized by the customer's geographic location (e.g., northeastern United States, southwestern United States, Southeast Asia, western Europe, etc.). The customer may further be categorized based on their race, income, familial status, etc. The demographic categorization may then be used to tailor the authentication process to better suit the customer's background. For example, a customer living in New York City may not know their neighbor's name or even own a car, as such an authentication question related to such information could be less effective.

At process block 130, based on the processed customer profile data, authentication questions are generated. In one embodiment, the questions may be selected from a question database (i.e., question database 320 in FIG. 3) or other store of questions. For example, if it is determined from the customer data profile that the customer lives in an apartment, then the question "Please provide the name of your apartment complex" may be presented to the customer. Conversely, if it is determined from the customer data profile that the customer does not have a phone, then the question "What name is your phone number listed in the white pages" may not be presented to the customer. As such, based on the information within the customer data profile, a number of customized questions to suit the customer are selected from the database of questions.

In one embodiment, the questions are "open-ended" questions. Open-ended questions may be questions in which the customer is required to produce answers to the questions on their own. Such questions have the benefit of added privacy because no private information is given to a potentially fraudulent actor, and such questions provide added security because a potentially fraudulent actor would not be able to guess a correct answer.

At process block 135, the selected open-ended questions are presented to the customer. The questions may be presented in a variety of ways. For example, the questions may be presented in a web-based presentation (e.g., a web page with the text of the question, a text box to input the answer, and a submit button). In an alternative embodiment, the questions may be presented in an extensible language markup (XML) interface. In a further embodiment, an IVR system may present the questions to the customer, and the IVR system would then gather the customer's audible answers and process them into computer searchable data. Additionally, a voice biometric system may be used in conjunction with the authentication questions in order to further facilitate in the authentication of the customer.

In yet a further embodiment, the authenticating entity may be able to customize the presentation of each individual question. For example, the wording of each question may be rearranged, or the order in which questions are present to the customer may be changed. In order to meet the needs of the authenticating entity, the questions may be completely customizable.

At process block 140, the answers received from the customer are processed and compared against the information in the customer data profile. This process may be automated using a method for comparing the customer's answer with the correct answer from the data profile. The answers may not match exactly to the correct answer, but nonetheless may still be correct. Therefore, the answers may receive a rating score (process block 145). In one embodiment, merely by way of example, the score may be rated from 0 to 100 points. Where 100 points is awarded to a perfect answer and 0 points is awarded to a completely wrong answer. In the alternative, or in addition to the rating score process, a pass/fail process may be implemented. As such, based on the accuracy at which the customer answers the authentication questions, the customer either receives a score of pass or fail.

For example, if the question asked is "What city and state do you currently reside?", an answer that may receive a score of 95 may be "Denver, Colo." were the information in the customer profile data is "Denver, Colo." In one embodiment, the "correct answer" and the received answer may be compared using word and/or character comparisons. For example, the correct answer and the received answer may be parsed, and then each character from the correct answer is compared with each character from the receiver answer in order to determine the level of accuracy of the received answer. In a further embodiment, a rules dictionary may be used to facilitate in the comparison processes. For example, the rules dictionary may include references to abbreviations such as, state appreciations (e.g., California=CA, Colorado=CO, etc.), address abbreviations (e.g., Avenue=Ave., Street=St., etc.), etc.

Accordingly, based on this comparison process, each answer to each question is assigned a score and then, according to one embodiment, an average or total score is assigned to the customer. It may then be determined whether the customer's score meets an acceptable range or a threshold level (decision block 150). In one embodiment, merely by way of example, the threshold may be a score of 75. However, other thresholds may be used. The threshold may be raised or lowered in order to accommodate the needs of the authenticating entity. For example, if the authenticating entity requires added security, the threshold score may be raised to 85 points, whereas if the authenticating entity requires less security and more convenient, the threshold score may be lowered to 65 points.

Consequently, if the customer's score meets the prescribed threshold, then the customer is authenticated (process block 170) and the customer's request may then be processed (process block 175). However, if the customer's score falls below the threshold score level, then the customer may be presented with additional questions (process block 155). These additional questions may be generated in a similar way as the previously presented questions. In one embodiment, the database of questions may have a set of questions that are reserved for customers that initially fail authentication.

At process block 160, an authentication score for the customer is re-calculated. In one embodiment, the re-calculated score is calculated individually; however, the initial score and the subsequent score may be calculated together into one score. At decision block 165, it is determined whether the re-calculated score meets the threshold value. The same threshold value may be used, or the threshold value may be changed. For example, because the customer failed the initial authentication, the authentication entity may require a higher score on the subsequent set of questions.

If the customer's score meets the required authentication threshold, the customer may then be authenticated (process block 170) and their request may then be processed (process block 175). If the customer's authentication score still fails to meet the threshold, then the customer may fail authentication and their request may be rejected (process block 180). However, in an alternative embodiment, the failed customer may be directed to call or initiate an on-line chat with a customer services representative.

Figure 2:
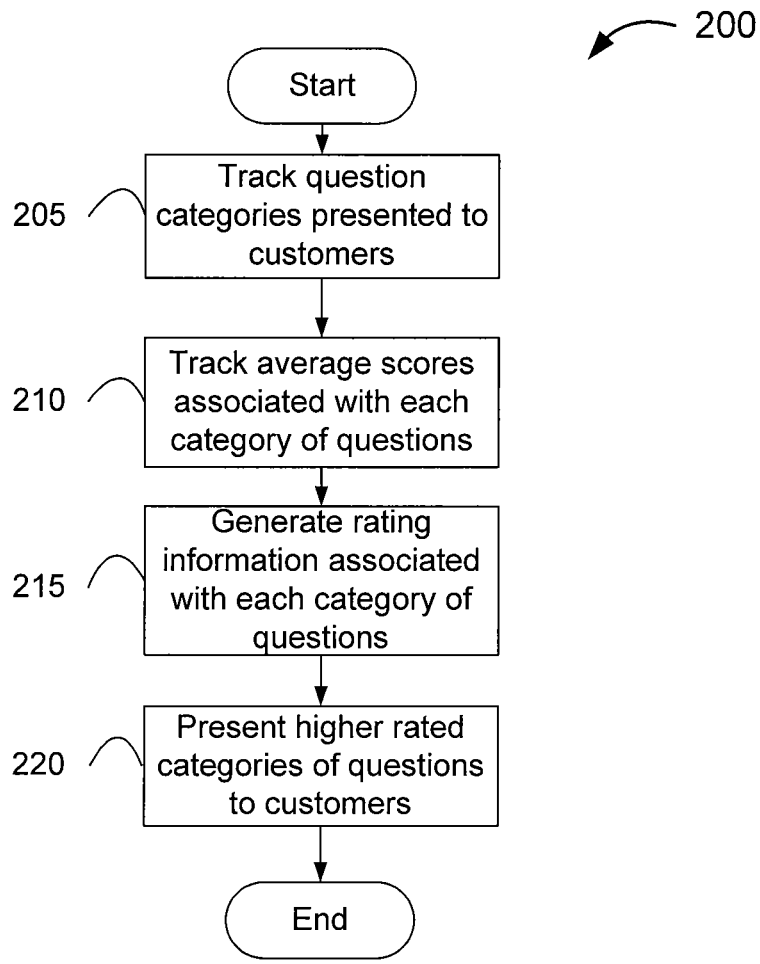
FIG. 2 is a flow diagram illustrating a method for tracking and rating questions presented to customers, in accordance with various embodiments of the invention.

Turning now to FIG. 2 which illustrates a method 200 for tracking and rating authentication questions according to embodiments of the invention. The tracking and rating of authentication questions may provide for a more dynamic authentication solution. For example, if it is determined that valid customers consistently have a lower score (e.g., 25 points) for a certain set of questions, those questions may be removed from the database of questions. Whereas, if valid customers consistently score higher (e.g., 90 points) on a set of questions, those questions may be presented to customers with more regularity. Furthermore, if a certain demographics consistently have a more difficult time with certain questions, those questions may not be presented to that demographic.

In a further embodiment, if it is determined that fraudulent actors are consistently able to receive a high score on certain questions by guessing, such questions may be removed from the database of questions. Accordingly, the authentication method is dynamic and adaptable to meet the security needs of the authenticating entity, while at the same time providing the customer with a convenient and easy way to become authenticated.

At process block 205, each category of questions that are presented to customers may be tracked. For example, a running score total for each category may be tracked and a running score total for each individual question within each category may also be tracked. At process block 210, the average score associated with each category of questions and each individual question may be tracked. This scoring information may be used to determine the effectiveness of each category of questions and additionally each individual question.

At process block 215, based on the scores associated with the categories and the individual questions, the categories and questions may be assigned ratings. In one embodiment, the ratings may be determined in conjunction with the demographics of the customer answering the questions. The ratings assigned to the questions and categories may be used by the authenticating entity to determine which questions are better suited for their customers, as well as the effectiveness of each category and individual questions. In one embodiment, based on the ratings of the categories and questions, the higher rated questions are presented to the customers during authentication (process block 220).

Figure 3:
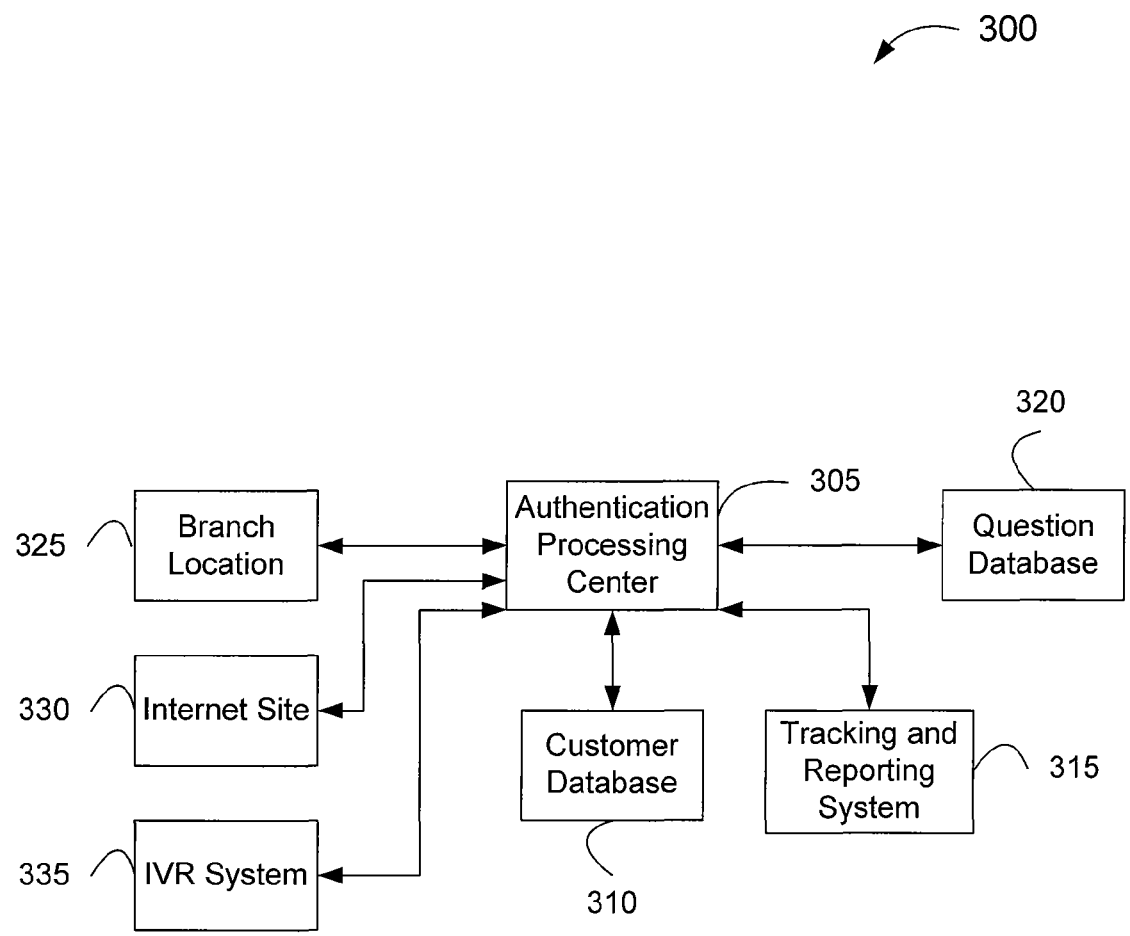
FIG. 3 is a block diagram illustrating a system for implementing customer identification, in accordance with various embodiments of the present invention.

Turning now to FIG. 3 which illustrates a system 300 for authenticating the identity of customers. In one embodiment, system 300 may include an authentication processing center 305. Authentication processing center 305 may be configured to process and manage authentication requests from customers. For example, when a customer enters a branch location 325, logs on to an internet site 330, or calls into an IVR system 335 an authentication is required to verify the customer's identify, such an authentication request may be forwarded to authentication processing center 305 via a communication medium (e.g., an Internet connection, a telephone line, etc.).

In one embodiment, authentication processing center 305 may be connected to a customer database 310 and a question database 320. When authentication processing center 305 receives an authentication request from a customer, center 305 may query customer database 310 in order to obtain the customer's profile data. Based on the profile data, authentication processing center 305 may then access question database 230 to gather authentication questions to present to the customer.

In one embodiment, authentication processing center 305 may present the gathered questions to the customer via the same transmission medium that the request was received. Authentication processing center 305 then receives the answers to the presented questions and compares the answers with the information in the customer's identity data. Based on the accuracy of the answers, the customer either passes or fails authentication. The authentication determination may also be based on a point score assigned to the customer (i.e., the scoring method in FIG. 1); however, the authentication determination may be based on other methods.

System 300 may also include tracking and reporting system 315 connected to authentication processing center 305. In one embodiment, tracking and reporting system 315 may gather data regarding the answering of the questions presented to the customers. For example, tracking and reporting system 315 may track how often questions are correctly and/or incorrectly answered, as well as how effective certain questions are for certain demographics. Furthermore, the effectiveness of certain categories of questions may be tracked. In one embodiment, tracking and reporting system 315 may perform the method as described in FIG. 2. In a further embodiment, based on the tracking of the questions, tracking and reporting system 315 may then generate various reports to be sent to authentication processing center 305. Authentication processing center 305, may then use the reports to refine and customize the questions presented to the customers.

Figure 4:
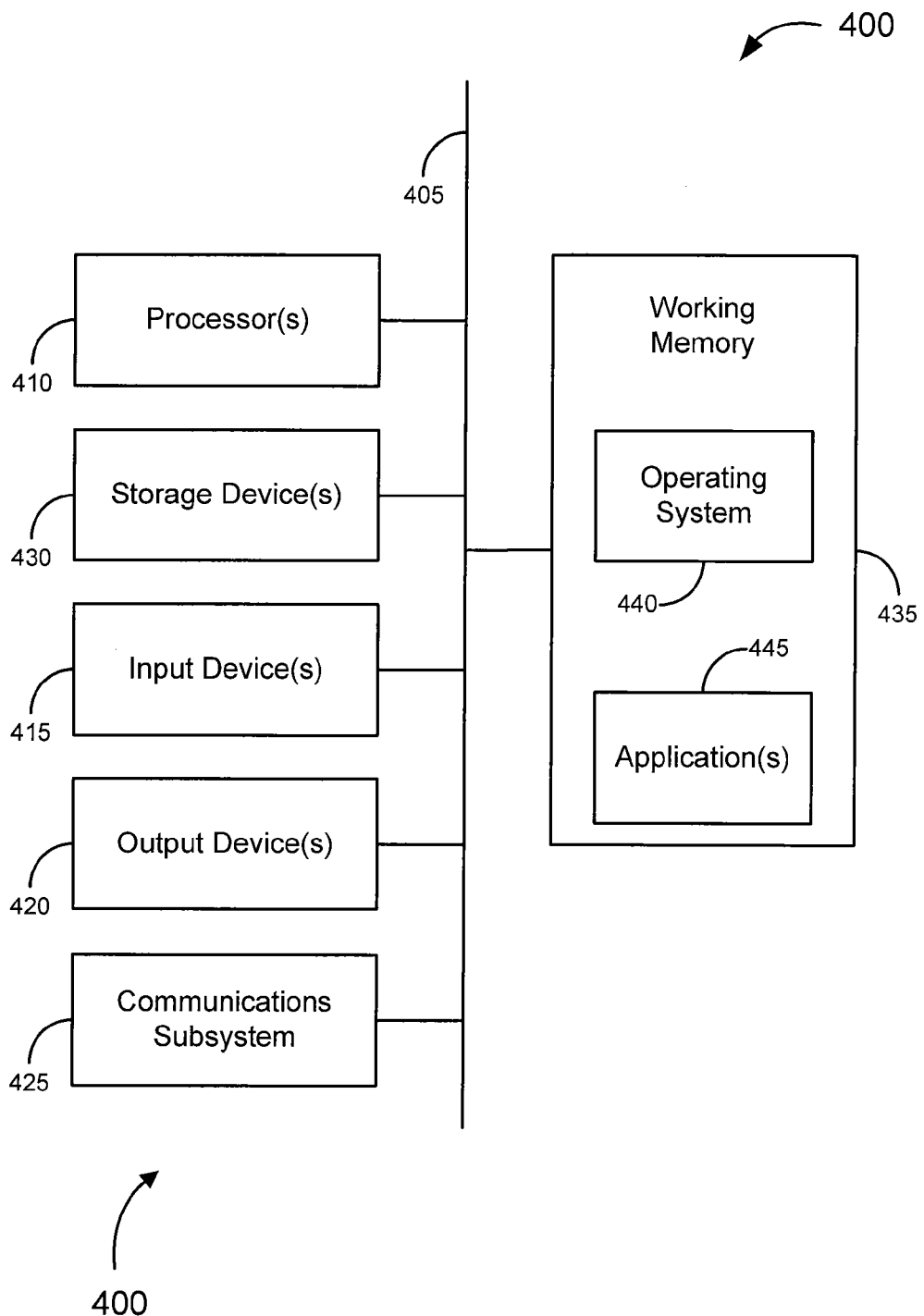
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function as authentication of a customer's identity. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s)

425 described above. In some cases, the storage medium might be incorporated within a computer system, such as the system 400. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
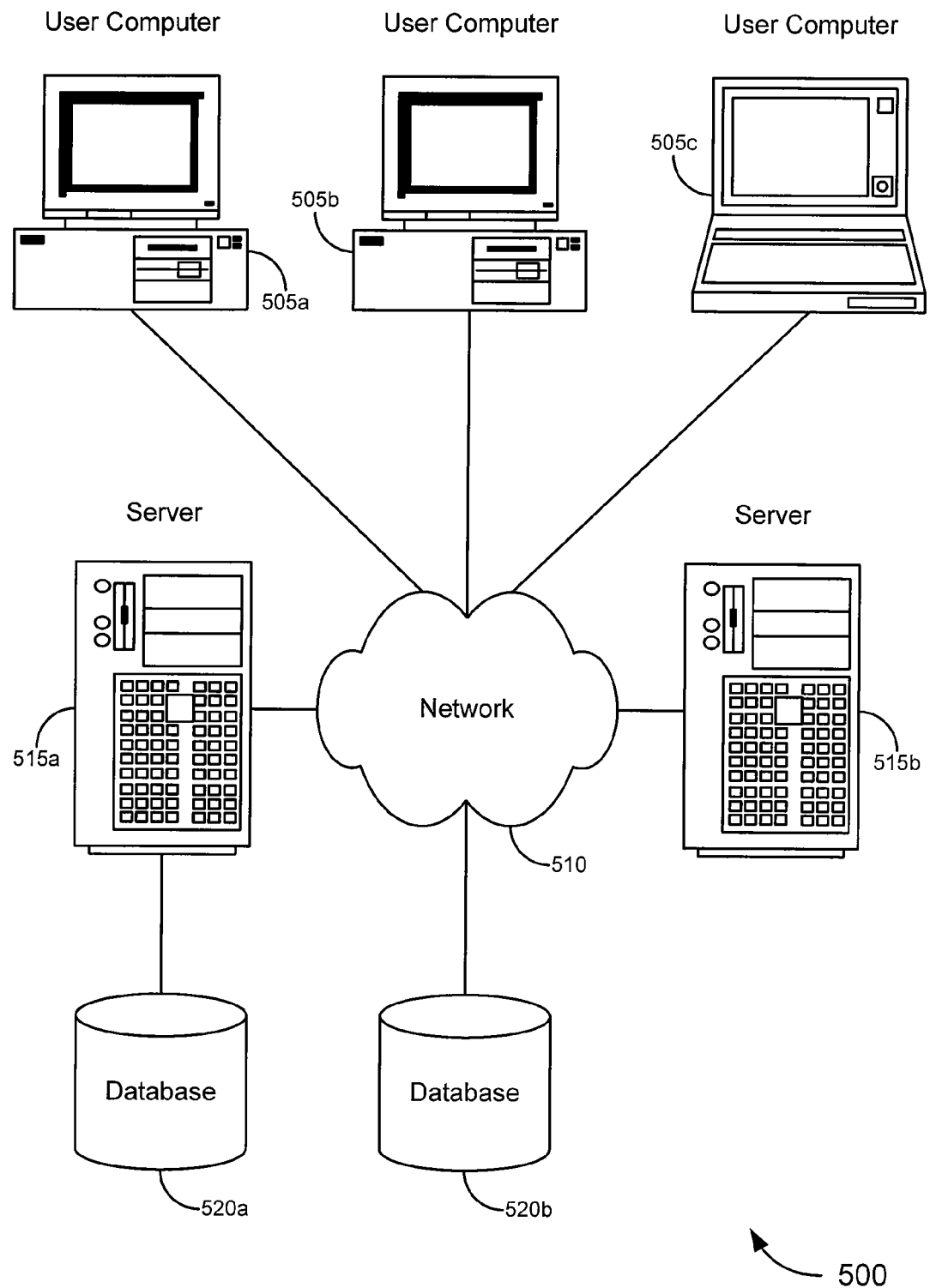
FIG. 5 is a block diagram illustrating a networked system of computers, which can be used in accordance with various embodiments of the invention.

A set of embodiments comprises systems for identifying customer identities. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant, capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more file and/or application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 505 and/or another server 515. In some embodiments, an application server can create web pages dynamically for displaying the information in accordance with embodiments of the invention, such as questions presented to customers for identification purposes. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary, merely by way of example, a database 520a might reside on a storage medium local to (and/or resident in) a server 515a (and/or a user computer 505). Alternatively, a database 520b can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 535 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without-certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for automated authentication of a customer's identity, the method comprising:
   receiving, by a computer system, a service request from a customer;
   retrieving, by the computer system, customer profile information related to the customer;
   generating, by the computer system, a first plurality of open-ended questions based on the customer profile information, wherein the first plurality of open-ended questions have question types associated with each question, and wherein the generating of the first plurality of open-ended questions comprises:
tracking the question types associated with each question,
tracking an average score for each question type,
generating a question rating report for each question type based on the average score of each question type, and
presenting higher rated questions to the customer based on the report;
designating, by the computer system, a first plurality of correct answers based on the customer profile information which correspond to the first plurality of open-ended questions;
receiving a first plurality of answers to the first plurality of open-ended questions from the customer;
automatically analyzing, by the computer system, the first plurality of answers by comparing the first plurality of answers with the first plurality of correct answers by parsing each of the first plurality of answers and performing a character-by-character accuracy analysis of the first plurality of answers in comparison to a character-by-character analysis of the first plurality of correct answers;
calculating, by the computer system, authentication scores for each of the first plurality of answers, wherein each authentication score represents a correctness of each of the plurality of answers relative to the corresponding correct answer;
rating each of the plurality of questions based on the correctness each of the plurality of answers relative to the corresponding correct answer;
increasing the frequency of use of the plurality questions as a function of the rating of each of the plurality of questions, wherein the higher the rating of a question the more frequent the question is used; and
authenticating, by the computer system, the customer if each of the authentication scores is cumulatively at least greater than a threshold value.

2. The method of claim 1, further comprising:
presenting, by the computer system, the customer with a second plurality of open- ended questions based on the first authentication scores being less than the threshold value;
designating, by the computer system, a second plurality of correct answers based on the customer profile information which correspond to the second plurality of open-ended questions;
receiving, by the computer system, a second plurality of answers to the second plurality of open-ended questions from the customer;
analyzing, by the computer system, the second plurality of questions by comparing the second plurality of answers with the second plurality of correct answers by parsing each of the second plurality of answers and performing a character-by-character accuracy analysis of the second plurality of answers in comparison to a character-by-character analysis of the second plurality of correct answers;
calculating, by the computer system, authentication scores for each of the plurality of second answers, wherein each authentication score represents a correctness of each of the plurality of answers relative to the corresponding correct answer; and
authenticating, by the computer system, the customer based on the authentication scores from the first and second pluralities of answers being cumulatively greater than the threshold value.

3. The method of claim 1, further comprising:
rejecting, by the computer system, the service request from the customer based on the authentication scores being less than the threshold value.

4. The method of claim 2, further comprising:
processing, by the computer system, the customer profile information to demographically categorize the customer; and
customizing, by the computer system, the first and second plurality of questions based on the demographic categorization of the customer.

5. The method of claim 2, wherein the question types are based on at least one of consumer questions, family relation questions, address history questions, vehicle questions, real estate questions, or business questions.

6. The method of claim 1, wherein the service request includes an associated service request type.

7. The method of claim 6, further comprising:
determining, by the computer system, whether authentication is required based on the service request type associated with the service request.

8. A system for authentication of a customer's identity, the system comprising:
a processor coupled with a computer-readable non-transitory storage medium having sets of instructions stored thereon which, when executed by the processor cause the processor implement the following:
a question database configured to store a plurality of open-ended authentication questions;
a customer database configured to store customer profile data; and
a processing center coupled to the question database and the customer database configured to:
receive a service request from a customer;
retrieve customer profile data related to the customer from the customer database;
retrieve the plurality of open-ended authentication questions from the question database based on the customer profile data, wherein the first plurality of open-ended questions have question types associated with each question, and wherein the retrieving of the plurality of open-ended questions comprises:
tracking the question types associated with each question,
tracking an average score for each question type,
generating a question rating report for each question type based on the average score of each question type, and
presenting higher rated questions to the customer based on the report;
designating a plurality of correct answers based on the customer profile information which correspond to the plurality of open-ended authentication questions;
present the plurality of open-ended authentication questions to the customer;
receive a plurality of answers to the plurality of open-ended authentication questions;
automatically analyze the plurality of answers by comparing the plurality of answers with the plurality of correct answers by parsing each of the plurality of answers and performing a character-by-character accuracy analysis of the plurality of answers in comparison to a character-by-character analysis of the plurality of correct answers;

calculate authentication scores for each of the plurality of answers, wherein each authentication score represents a correctness of each of the plurality of answers relative to the corresponding correct answer;

rate each of the plurality of questions based on the correctness each of the plurality of answers relative to the corresponding correct answer;

increase the frequency of use of the plurality questions as a function of the rating of each of the plurality of questions, wherein the higher the rating of a question the more frequent the question is used; and authenticate the customer if each of the authentication scores is cumulatively at least greater than a threshold value.

9. The system of claim 8, wherein the processing center is further configured to:

retrieve a second plurality of open-ended questions from the question database based on the authentication scores being less than the threshold value;

present the second plurality of questions to the customer;

designating a second plurality of correct answers based on the customer profile information which correspond to the second plurality of open-ended questions;

receive a second plurality of answers to the second plurality of open-ended questions from the customer;

analyze the second plurality of questions by comparing the second plurality of answers with the second plurality of correct answers by parsing each of the second plurality of answers and performing a character-by-character accuracy analysis of the second plurality of answers in comparison to a character-by-character analysis of the second plurality of correct answers;

calculate authentication scores for each of the plurality of second answers, wherein each authentication score represents a correctness of each of the plurality of answers relative to the corresponding correct answer; and authenticate the customer based on the authentication scores from the first and second pluralities of answers being cumulatively greater than the threshold value.

10. The system of claim 9, wherein the processing center is further configured to reject the customer based on the authentication scores being less than the authentication value.

11. The system of claim 9, further comprising an interactive voice recognition (IVR) system configured to transmit the first and second pluralities of open-ended questions to the customer; and to receive the first and second pluralities of answers from the customer.

12. A non-transitory machine-readable medium including sets of instructions which, when executed by a machine, cause the machine to:

receive a service request from a customer;

retrieve customer profile information related to the customer;

generate a first plurality of open-ended questions based on the customer profile information, wherein the first plurality of open-ended questions have question types associated with each question, and wherein the generating of the first plurality of open-ended questions comprises:

tracking the question types associated with each question, tracking an average score for each question type, generating a question rating report for each question type based on the average score of each question type, and presenting higher rated questions to the customer based on the report;

designate a first plurality of correct answers based on the customer profile information which correspond to the first plurality of open-ended questions;

receive a first plurality of answers to the first plurality of open-ended questions from the customer;

automatically analyze the first plurality of answers by comparing the first plurality of answers with the first plurality of correct answers by parsing each of the first plurality of answers and performing a character-by-character analysis accuracy analysis of the first plurality of answers in comparison to a character-by-character analysis of the first plurality of correct answers;

calculate authentication scores for each of the first plurality of answers, wherein each authentication score represents a correctness of each of the plurality of answers relative to the corresponding correct answer;

rate each of the plurality of questions based on the correctness each of the plurality of answers relative to the corresponding correct answer;

increase the frequency of use of the plurality questions as a function of the rating of each of the plurality of questions, wherein the higher the rating of a question the more frequent the question is used; and authenticate the customer if each of the authentication scores is cumulatively at least greater than a threshold value.

13. The non-transitory machine-readable medium of claim 12, wherein the sets of instructions which, when further executed by a machine, cause the machine to:

present the customer with a second plurality of open-ended questions based on the first authentication scores being less than the threshold value;

designate a second plurality of correct answers based on the customer profile information which correspond to the second plurality of open-ended questions;

receive a second plurality of answers to the second plurality of open-ended questions from the customer;

analyze the second plurality of questions by comparing the second plurality of answers with the second plurality of correct answers by parsing each of the second plurality of answers and performing a character-by-character accuracy analysis of the second plurality of answers in comparison to a character-by-character analysis of the second plurality of correct answers;

calculate authentication scores for each of the plurality of second answers, wherein each authentication score represents a correctness of each of the plurality of answers relative to the corresponding correct answer; and authenticate the customer based on the authentication scores from the first and second pluralities of answers being cumulatively greater than the threshold value.

14. The non-transitory machine-readable medium of claim 12, wherein the sets of instructions which, when further executed by a machine, cause the machine to reject the service request from the customer based on the first authentication score being less than the threshold value.

* * * * *